(12) United States Patent
Hsieh

(10) Patent No.: US 7,584,305 B2
(45) Date of Patent: Sep. 1, 2009

(54) SERIAL PERIPHERAL INTERFACE CIRCUIT

(75) Inventor: Ming-Chih Hsieh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 69 days.

(21) Appl. No.: 11/960,751

(22) Filed: Dec. 20, 2007

(65) Prior Publication Data

US 2009/0125657 A1  May 14, 2009

(30) Foreign Application Priority Data

Nov. 12, 2007  (CN) .................. 2007 1 0202482

(51) Int. Cl.
*G06F 3/00* (2006.01)
*G06F 13/00* (2006.01)
(52) U.S. Cl. .................... 710/2; 710/110; 710/316; 710/305
(58) Field of Classification Search ............. 710/2–4, 710/8–10, 36–38, 110, 305, 316–317
See application file for complete search history.

(56) References Cited

U.S. PATENT DOCUMENTS

| | | | | |
|---|---|---|---|---|
| 4,769,781 | A * | 9/1988 | Shirota et al. | 710/305 |
| 6,507,581 | B1* | 1/2003 | Sgammato | 370/381 |
| 2002/0040443 | A1* | 4/2002 | Maeda et al. | 713/320 |
| 2007/0143512 | A1* | 6/2007 | Kuo | 710/110 |

* cited by examiner

*Primary Examiner*—Christopher B Shin
(74) *Attorney, Agent, or Firm*—Frank R. Niranjan

(57) ABSTRACT

An exemplary serial peripheral interface circuit includes a host, a plurality of slaves, and a decoder. A data output terminal, a data input terminal, and a serial clock terminal of the host are connected to a data input terminal, a data output terminal, and a serial clock terminal of each slaves respectively. A slave select terminal of the host is connected to a data receive terminal of the decoder. GPIO pins of the hot are connected to corresponding input terminals of the decoder correspondingly. A select terminal of each slave is connected to a corresponding output terminal of the decoder. The address generated by the GPIO pins controls the decoder, so that the select terminal of the host can be connected to a corresponding slave device via the decoder.

3 Claims, 2 Drawing Sheets

SERIAL PERIPHERAL INTERFACE CIRCUIT

BACKGROUND

1. Field of the Invention

The present invention relates to a serial peripheral interface circuit.

2. Description of Related Art

Referring to FIG. 2, a conventional serial peripheral interface circuit includes a host 100 and a slave 200. The host 100 includes a data output terminal MOSI, a data input terminal MISO, a serial clock terminal SCLK, a slave select terminal SS0. The slave 200 includes a data input terminal SDI connected to the data output terminal MOSI of the host 10, a data output terminal SDO connected to the data input terminal MISO of the host 10, a serial clock terminal SCLK connected to the serial clock terminal SCLK of the host 10, and a select terminal CS connected to the slave select terminal SS0 of the host 100. Therefore, the host 100 can select the slave 200 for transmitting data. However, if there is more than one slave connected to the host 100, the host 100 cannot distinguish them.

SUMMARY

An exemplary serial peripheral interface circuit comprises a host comprising a data output terminal, a data input terminal, a serial clock terminal, a slave select terminal, and a plurality of general purpose input/output port (GPIO) terminals; a plurality of slaves each comprising a data input terminal connected to the data output terminal of the host, a data output terminal connected to the data input terminal of the host, a serial clock terminal connected to the serial clock terminal of the host, and a select terminal; and a decoder comprising an enable terminal, a plurality of input terminals, and a plurality of output terminals, wherein, an amount of the input terminals of the decoder is equal to an amount of the GPIO terminals of the host, the input terminals are connected to the GPIO terminal respectively, an amount of the output terminals of the decoder is equal to an amount of the slaves, the output terminals of the decoder are connected to the select terminals of the slaves respectively for selecting one of the slaves.

Other advantages and novel features of the present invention will become more apparent from the following detailed description of preferred embodiment when taken in conjunction with the accompanying drawings, in which:

DETAILED DESCRIPTION

Figure 1:
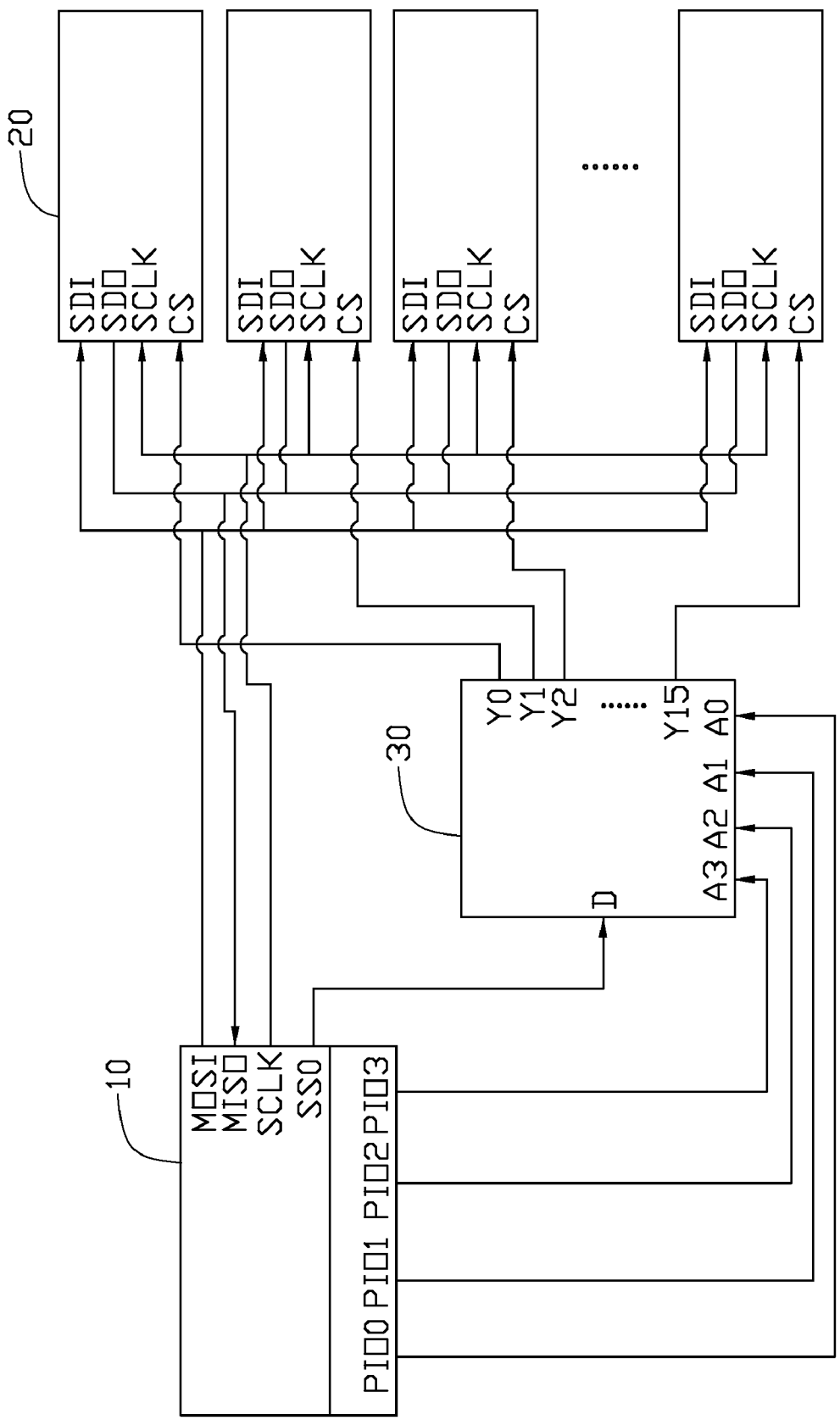
FIG. 1 is a circuit diagram of a serial peripheral interface circuit in accordance with an embodiment of the present invention.
Figure 2:
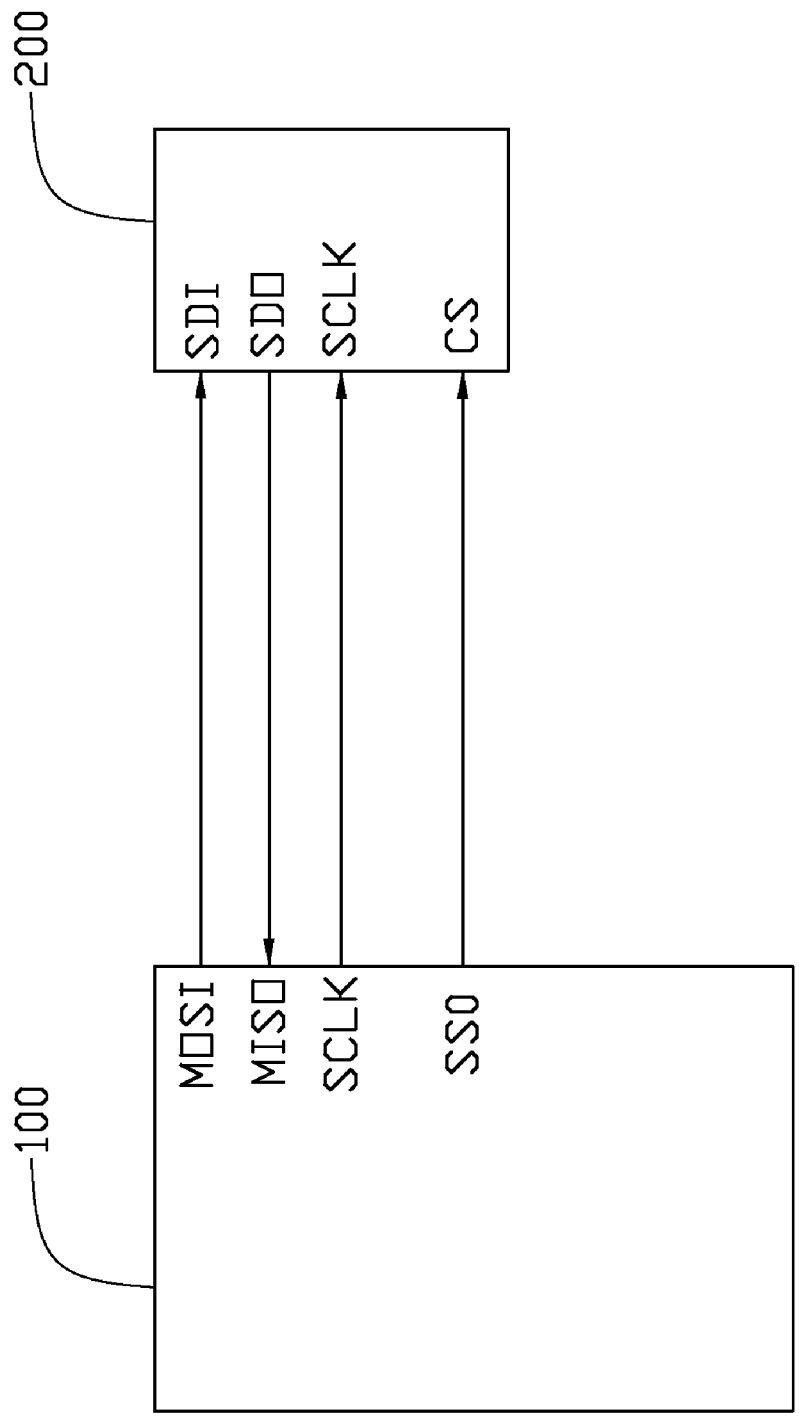
FIG. 2 is a circuit diagram of a conventional serial peripheral interface circuit.

Referring to FIG. 1, a serial peripheral interface (SPI) circuit in accordance with an embodiment of the present invention includes a host 10, sixteen slaves 20, and a decoder 30. The host 10 includes a data output terminal MOSI, a data input terminal MISO, a serial clock terminal SCLK, a slave select terminal SS0, and four general purpose input/output port (GPIO) terminals PIO0~PIO3. Each of the slaves 20 includes a data input terminal SDI connected to the data output terminal MOSI of the host 10, a data output terminal SDO connected to the data input terminal MISO of the host 10, a serial clock terminal SCLK connected to the serial clock terminal SCLK of the host 10, and a select terminal CS. The decoder 30 includes an enable terminal D connected to the slave select terminal SS0 of the host 10, four input terminals A0~A3 connected to the GPIO terminals PIO0~PIO3 of the host 10 respectively, and sixteen output terminals Y0~Y15 connected to the select terminal CS of the slaves 20 respectively for selecting one of the slaves 20.

In this embodiment of the invention, the GPIO terminals PIO0~PIO3 of the host 10 output four bit addresses corresponding to the slaves 20. That is, each of the addresses 0000~1111 can select a corresponding one of the sixteen slaves 20 via the decoder 30, for example when the address is 0001 the output terminal Y1 of the decoder 30 is connected to the enable terminal D for coupling the slave select terminal SS0 of the host 10 to a corresponding slave of the slaves 20.

In this embodiment of the invention, the amount of the GPIO terminals of the host 10 is four, the amount of the input terminals of the decoder 30 is four, the amount of the slaves 20 is sixteen, the amount of the output terminals of the decoder 30 is sixteen. The amount of the GPIO terminals of the host 10, the input terminals of the decoder 30, the output terminals of the decoder 30, or the slaves 20 are not limited those of the embodiment.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A serial peripheral interface (SPI) circuit comprising:
   a host comprising a data output terminal, a data input terminal, a serial clock terminal, a slave select terminal, and a plurality of general purpose input/output port (GPIO) terminals;
   a plurality of slaves each comprising a data input terminal connected to the data output terminal of the host, a data output terminal connected to the data input terminal of the host, a serial clock terminal connected to the serial clock terminal of the host, and a select terminal; and
   a decoder comprising an enable terminal, a plurality of input terminals, and a plurality of output terminals,
   wherein, an amount of the input terminals of the decoder is equal to an amount of the GPIO terminals of the host, the input terminals are connected to the GPIO terminals respectively, an amount of the output terminals of the decoder is equal to an amount of the slaves, the output terminals of the decoder are connected to the select terminals of the slaves respectively for selecting one of the slaves.

2. The SPI circuit as claimed in claim 1, wherein the host is a central processing unit or microprocessor.

3. The SPI circuit as claimed in claim 1, wherein the amount of the GPIO terminals of the host is four, and the amount of the slaves is sixteen.

* * * * *